United States Patent [19]

Fielding et al.

[11] 3,760,413
[45] Sept. 18, 1973

[54] ACTIVITY DISPLAY

[75] Inventors: Francis L. Fielding, Montclair; Irving L. Fletcher, Fairlawn, both of N.J.

[73] Assignee: International Telephone and Telegraph Corporation, Nutley, N.J.

[22] Filed: Mar. 24, 1971

[21] Appl. No.: 127,723

[52] U.S. Cl. ............................................. 343/5 SC
[51] Int. Cl. ............................................. G01s 9/00
[58] Field of Search ............ 343/5 SC, 5 EM, 5 MM

[56] References Cited
UNITED STATES PATENTS

| 3,550,123 | 12/1970 | Brown et al. | 343/5 SC |
| 3,631,483 | 12/1971 | Ruggles | 343/5 SC |
| 3,653,044 | 3/1972 | Breeze et al. | 343/5 SC |
| 3,543,269 | 11/1970 | Dudley | 343/5 EM |
| 3,218,637 | 11/1965 | Balding | 343/5 SC |

Primary Examiner—Benjamin A. Borchelt
Assistant Examiner—G. E. Montone
Attorney—C. Cornell Remsen, Jr., Walter J. Baum, Paul W. Hemminger, Charles L. Johnson, Jr., Philip M. Bolton, Isidore Togut, Edward Goldberg and Lonbardi, JR.: Menotti J.

[57] ABSTRACT

This invention relates to a method and apparatus for displaying the presence or absence of signal activity. Signal activity is stored at a slow rate optimum for the receiver and then read out at a fast rate (above that of the flicker rate), so that the operator has a visually constant display output and fast phosphors can be used with high light outputs. The display is in the form of a "falling raster" in which successive stored sweeps are vertically ordered; the newest at the top, the oldest at the bottom. In sequence, the oldest sweep is purged from storage and the newest activity added in a spatially ordered manner to the raster.

11 Claims, 2 Drawing Figures

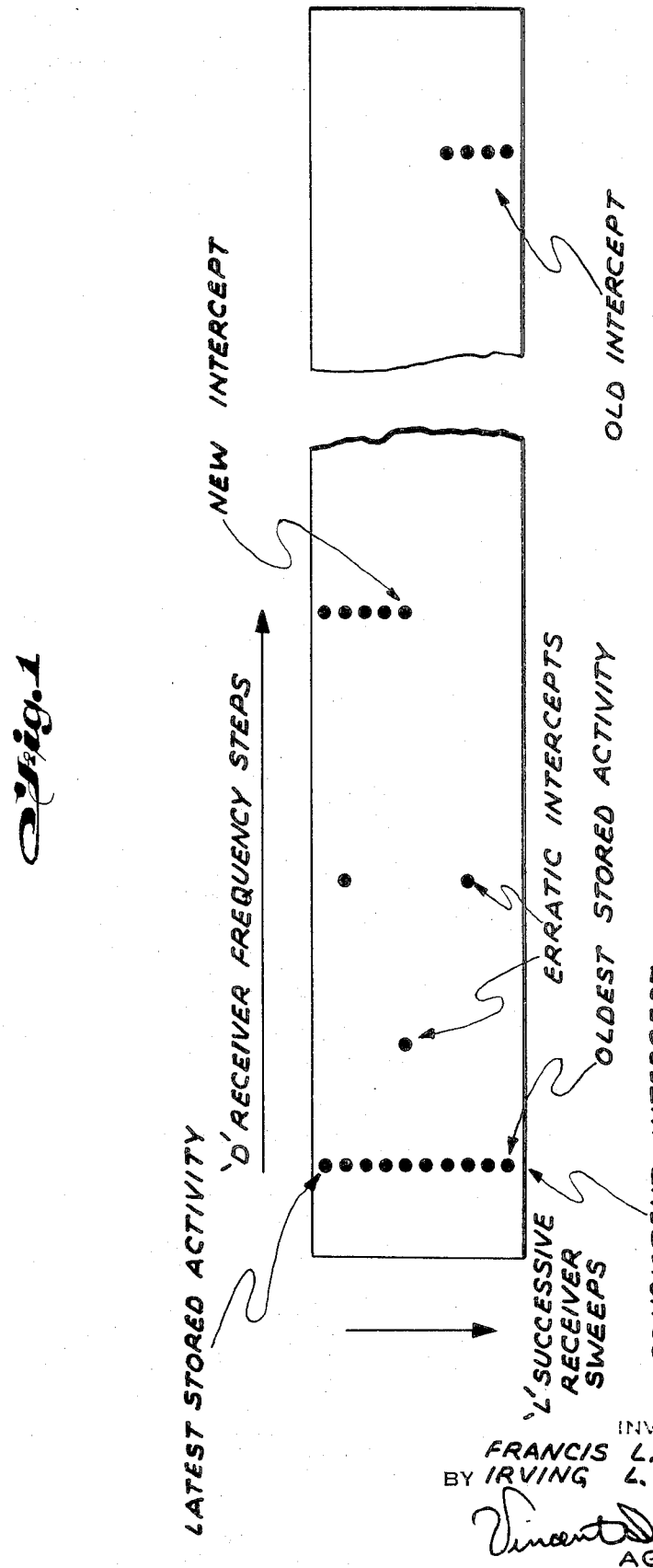

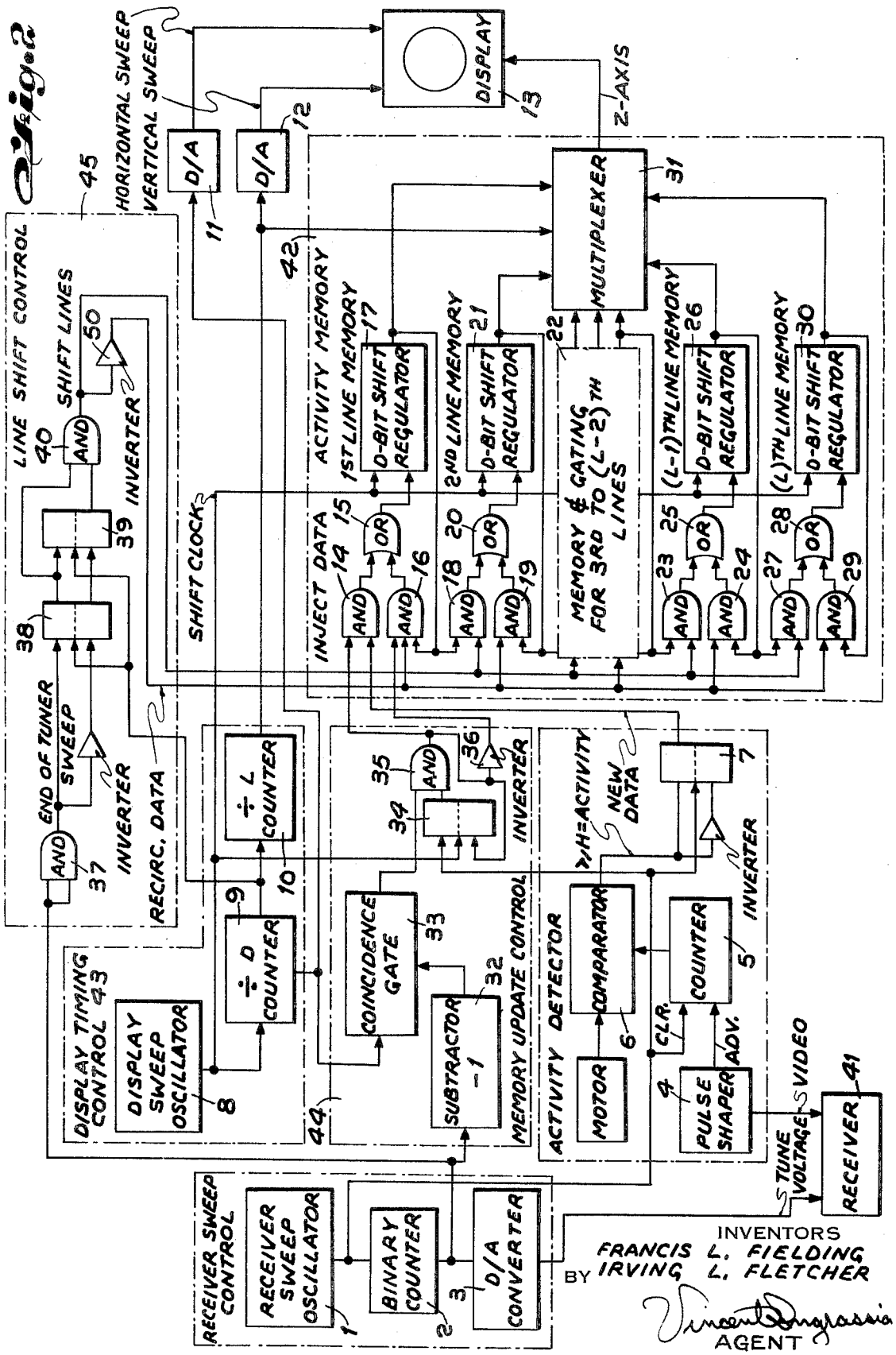

ACTIVITY DISPLAY

BACKGROUND OF THE INVENTION

This invention relates to an automatic activity display and more particularly to an automatic activity display in which a history of signal activity is stored and displayed.

In surveillance systems currently in use, a slow scanning receiver scans the RF spectrum of interest in a series of discrete frequency steps (dwells), typically 10ms in duration. An accompanying display, sometimes called a panoramic display, is swept in synchronism with the frequency steps so that the horizontal axis of the display provides the frequency and the vertical axis the amplitude of the signal activity which shows itself as a vertical deflection. This method has certain disadvantages. As the signal activity is often of a transitory nature and the receivers require time to shift frequency, there are inherent limitations in the speed with which the receiver frequency can be swept. Assuming a typical sweep with 200 dwells per band, a total sweep time of two seconds is required. This results in a visual display that consists of a bright moving dot, and requires complete concentration on the part of the operator if he is to detect intermittent signal activity. This can to some extent be improved by using a slow phosphor CRT, but at best this is a compromise, and in many applications a fast phosphor CRT is required for other reasons. In addition, when using a slow phosphor CRT, the operators eyes must contend with the high light output of the writing spot as it crosses his field of vision every two seconds.

A second display technique, the "falling raster," sweeps in the same manner as described above, but signal activity is shown as intensity (Z axis) modulation of the trace. Successive sweeps are displaced vertically on a slow phosphor to provide a history of receiver sweeps. Consistent signal activity will then show as a vertical line on the CRT.

The falling raster display also presents certain disadvantages. If the number of sweeps that are made is increased, the average light output from the display is reduced, and the operators eyes must contend with a large dynamic range of light output. As the latest update of the display is continually moving through his field of vision, the operator must contend with wide changes in light level. This is poor from a human factors viewpoint and is ambiguous in that the position of new and old traces is constantly changing.

Another disadvantage lies in the variation of receiver sensitivity with frequency, which causes the intensity modulation to vary across the display face in a manner unrelated to signal amplitude.

A further problem with both of the above described display techniques is that due to the long decay times of the slow phosphors used, no cursors can be moved without smearing the display.

SUMMARY OF THE INVENTION

It is an object of the present invention to provide an apparatus and method for displaying the presence or absence of signal activity and a history of said signal activity while avoiding the above mentioned disadvantages.

According to a broad aspect of the invention there is provided a method for displaying signal activity comprising scanning the signal spectrum of interest with a scanning device, detecting the presence of signal activity during each sweep of said scanning device, storing said signal activity associated with a predetermined number of sweeps of said scanning device in a memory, reading out from said memory said signal activity associated with said predetermined number of sweeps, and displaying said stored signal activity on a display unit as a falling raster, each of said predetermined number of sweeps forming one line of said falling raster, the latest sweep forming the first line and the oldest sweep forming the last line.

According to a further aspect of the invention there is provided an activity display in which a history of signal activity is stored and displayed, comprising means for scanning the signal spectrum of interest, means for detecting the presence of signal activity during each scanning sweep, a memory for storing said signal activity associated with a predetermined number of scanning sweeps, means for reading out from said memory said signal activity associated with said predetermined number of scanning sweeps, and a display unit for displaying said stored signal activity as a falling raster, each of said predetermined number of scanning sweeps forming one line of said falling raster, the latest sweep forming the first line and the oldest sweep forming the last line.

The above and other objects of the present invention will be better understood from the following detailed description taken in conjunction with the accompanying drawings, in which:

BRIEF DESCRIPTION OF THE DRAWINGS

FIG. 1 shows an example of a display, of the falling raster type, according to the invention; and FIG. 2 shows, in functional block diagram form, one embodiment for carrying out the present invention.

DESCRIPTION OF THE PREFERRED EMBODIMENTS

The receiver frequency is swept in discrete steps, and the presence or absence of signal activity is digitally recorded independently of the display function.

FIG. 1 shows a display of the falling raster type. As each successive receiver sweep or predetermined number of sweeps is stored, the activity so obtained replaces the top line of the display. The oldest stored activity forms the bottom line of the display. When the latest sweep replaces the top line of the display, all previous stored sweeps drop by one line, and the oldest stored sweep is purged out of the system.

As the activity storage is independent of the diSplay readout, both the receiver and the display can be operatedd at their optimum rates. The receiver can be swept slowly to maximize intercept probability on signals that occur at slow repetition rates, and the display can be updated at a rate higher than the flicker rate to provide a bright constant light level display. As a fast phosphor tube can be used, the display can be used in other modes, and cursors can be readily applied to identify signals of interest. Because the storage is digital, complete registration between sweep and cursor can be assured.

As the latest updated sweep is always at the top of the raster, the past history of signal activity is always ordered.

Receiver sensitivity variations are not a problem, as the presence or absence of an intercept is recorded instead of the signal level.

The probability of intercept can be made as high as desired by increasing the number of raster lines and/or re-circulating the stored intercepts several times for each line. Using a display according to this invention, the operator is not required to view the sweep at all times to observe an intercept, and a number of bands can be viewed simultaneously on the same CRT without compromising operator performance.

An arrangement for carrying out the invention will now be described with reference to FIG. 2.

Receiver sweep oscillator 1 determines the rate at which the receiver 41 steps across the frequency band. A binary counter 2 counts the number of steps and hence determines the total number of discrete stored frequencies across the swept band. A digital-to-analog converter 3 changes the binary state of the counter into the tuning voltage necessary for tuning the receiver 41.

The video output from receiver 4 is regenerated in pulse shaper 4, and the number of pulses intercepted are counted in counter 5. A numerical comparator 6 produces an output only if the value in counter 5 exceeds a preset value M. This feature is specific to the use of the device as an activity display for pulsed radar signals and prevents the registering of random noise as activity. Many other criteria can be used to determine the validity of an intercept.

At the end of each receiver step (dwell) the output of comparator 6 activates bistable multivibrator (flip-flop) 7 for the purpose of updating activity memory, and the counter 5 is cleared to ready it for the next dwell.

The display 13 and the activity memory 42 are controlled by the display timing control 43. The position of the electron beam on the display face is performed as follows:

Display sweep oscillator 8 determines the rate at which the electron beam in the CRT is swept across the display, both horizontally and vertically, while counter 9 counts the number of steps and hence the number of columns across the screen of the display. Counter 9 and counter 2 both count to D, so that there is direct correspondence between the receiver frequency steps and the columns on the screen. Every time counter 9 completes a cycle it advances counter 10 which controls the vertical position of the electron beam and hence the number of horizontal lines in the display. Counters 9 and 10 drive digital-to-analog converters 11 and 12 which generate the corresponding analog voltages for driving the horizontal and vertical deflection plates in the display 13.

With static data, each shift register recirculates through the and/or gates at its input, e.g., for register 17, gates 15 and 16; for register 21, gates 19 and 20, etc. When inserting new data, the recirculate gate 16, 19, etc. is disabled and data is entered through the alternative gate (for register 17, gate 14). The waveforms for enabling the register input gates for line 1 are generated in the memory update control 44, while the waveforms for enabling the other lines are generated in the line shaft control circuitry 45.

The outputs from the L memories (17, 21, 22, 26 and 30) are multiplexed into one line in multiplexer 31 on command from counter 10. Since the vertical sweep is generated by counter 10, the selection by multiplexer 31 is such that the first memory line corresponds to the top line of the raster, and the $L^{th}$ line corresponds to the bottom of the raster. Each intervening line in memory corresponds to a specific line on the raster.

Activity on the raster is indicated as the intensification of the beam which is controlled by the output of multiplexer 31. Accordingly, the memory is loaded to identify each point requiring intensification. For intensification, the corresponding cell in memory is set to a logic "1," for non-intensification it is set to a logic "0."

The operations involved in the purging and updating of the display information will now be described.

Receiver sweeping is started. As the presence or absence of activity for each receiver dwell becomes available, it is entered into the corresponding location in line 1 of activity memory 17. For the presence of activity a logic 1 is entered; for no activity a logic 0 is entered. When the receiver sweep is complete and the entry for the last dwell completed, the data in each memory line is replaced with that of the line above and line 1 is emptied. The process is repeated for each receiver sweep, and successive lines represent correspondingly older sweeps.

The loading and readout of the memory is performed as follows:

It is to be noted that counter 9 is cycled more frequently than is counter 2. The difference in rate is sufficient for counter 9 to complete more than one cycle while counter 2 is only advanced one state, hereby assuring access to any required point in memory within each receiver dwell. Each shift register in activity memory 42 recirculates in synchronism with counter 9 to provide one complete shift around for every cycle of counter 9. Normally, each D bit shift register is connected to recirculate by connecting the output of the right most element to the input of the left most element for a shift-right operation. To clarify the description of the operation, identifying numbers are assigned to each element. This is done with counter 9 in the first state of the D state cycle. Sequential numbers are assigned to each element going from right to left, starting with 1 for the right-most element and ending with D for the left most element. Consequently, as counter 9 is advanced through the cycle, at each state the data appearing at the output of the register is the data contained in the element with the assigned number given by the state of counter 9 when counter 9 was in the first state. Since counter 9 also drives the horizontal sweep, the output of each shift register automatically provides the required data for modulating the electron beam of the display. Altering the data in any location is accomplished simply by breaking the recirculate path when counter 9 is in the state corresponding to the specified location and substituting the new data to the input of the register.

Entry of activity information into the memory is controlled by the memory update control circuitry 44. At the end of each receiver dwell, bistable multivibrator 34 is set synchronously with the display sweep oscillator 8 to indicate that a new data sample is available for entry into memory. Since the pulse edge identifying the end of the receiver dwell interval also advances counter 2 and sets bistable multivibrator 7, the resultant is that the data in bistable-multivibrator 7 corresponds to the location in memory given by the state of counter 2 minus one. This value is available as the output of subtractor 32. Since access to that location in memory is available when counter 9 is in that state, coincidence is sought between counter 9 and the output of substractor 32. At coincidence, coincidence gate 33 produces an output to enable gate 35. Gate 35 produces an output provided bistable multivibrator 34 is set. This output is used to enable gate 14 and disable gate 16 through inverter 36 which replaces the old information in the specified cell of register 17 with the information in bistable multivibrator 7. At the end of the clock interval (oscillator 8), bistable multivibrator 34 is reset to inhibit further update until bistable multivibrator 34 is set again when a new data sample becomes available.

The control signal for shifting lines is generated in the line shift control circuitry 45. The end of the receiver sweep is decoded from the state of counter 2 by gate 37. The output of gate 37 is used to set bistable multivibrator 38 in synchronism with counter 9, by clocking, it with the output of counter 9. The output of bistable multivibrator 38 is used to set bistable multivibrator 39, also clocked by the output of counter 9. Consequently, when the end of the receiver sweep is detected, there is one interval in synchronism with the counter 9 cycle during which bistable multivibrator 38 is set while bistable multivibrator 39 is reset, a combination which does not occur at any other time. This condition is used to enable AND gate 40. The output of AND gate 40 is used to disable the recirculate gates on all lines through inverter 50, and enable the new data entry gates for lines 2 through L. Since the output of gate 40 lasts one cycle, the data in each line is replaced by the data from the line above, except for line 1 which is erased.

While the invention has been described as it specifically relates to use in surveillance systems as a frequency/activity display, it has a broad application to any system in which information is gathered slowly but must be supplied to an operator of a rapid refresh rate so that the presentation is continuous and has no flicker, and where the information must be held in storage for a period to ensure that the phenomona is seen by the operator. As such, it has application in the viewing of any transient phenomona; for example, a direction-finding display (polar or linear), an azimuth/activity display or a display for many medical phenomona.

It is to be understood that the foregoing description of specific examples of this invention is made by way of example only and is not to be considered as a limitation on its scope.

We claim:

1. A method for displaying signal activity, comprising:
    scanning the signal frequency spectrum of interest with a scanning device;
    detecting the presence of signal activity during each sweep of said scanning device;
    storing digitally said signal activity associated with a predetermined number of sweeps of said scanning device in a memory;
    reading out from said memory said signal activity associated with said predetermined number of sweeps;
    displaying said stored signal activity on a display unit as a falling raster, each of said predetermined number of sweeps forming one line of said falling raster, the latest sweep forming the first line and the oldest sweep forming the last line;
    replacing the top line of said falling raster display with the latest stored sweep of said scanning device;
    dropping all previous stored sweeps by one line so that the past history of said signal activity is always ordered; and
    purging the oldest stored sweep out of said memory.

2. A method according to claim 1 wherein said scanning is performed in discrete steps.

3. A method according to claim 1 wherein said detecting step includes converting the presence of said signal activity into a voltage corresponding to a logic "1."

4. A method according to claim 1 wherein said storing step includes storing said signal activity associated with each sweep of said predetermined number of sweeps in a separate digital shift register.

5. A method according to claim 1 wherein said reading out is performed at a rate higher than the flicker rate of said display unit to provide a bright constant light level display.

6. A method according to claim 1 wherein said storing is performed at a rate which is independent of the rate of said reading out so that said scanning device and said display unit can be operated at their optimum rates.

7. A method according to claim 2 wherein said scanning device is an RF receiver sequentially tuned to discrete frequency steps.

8. A method according to claim 1 further including: increasing the number of raster lines to increase the probability of detecting the presence of said signal activity.

9. A method according to claim 4 further including re-circulating the contents of each of said separate digital register to increase the probability of detecting the presence of said signal activity.

10. An automatic activity display in which a history of signal activity is stored and displayed, comprising:
    means for scanning the signal frequency spectrum of interest;
    means for detecting the presence of signal activity during each scanning sweep;
    a digital memory for storing said signal activity associated with a predetermined number of scanning sweeps;
    means for reading out from said memory said stored activity associated with said predetermined number of scanning sweeps;
    a display unit for displaying said stored signal activity as a falling raster, each of said predetermined number of scanning sweeps forming one line of said falling raster, the latest sweep forming the first line and the oldest sweep forming the last line;
    means for replacing the top line of said falling raster display with the latest stored scanning sweep;
    means for dropping all previous stored sweeps by one line on said raster so that the past history of said signal activity is always ordered; and
    means for purging the oldest stOred sweep out of said memory.

11. An automatic activity display according to claim 10 wherein said memory includes a plurality of digital shift registers, each for storing said signal activity associated with one scanning sweep of said predetermined number of scanning sweeps.

* * * * *